United States Patent [19]

Speronello

[11] Patent Number: 4,601,997
[45] Date of Patent: Jul. 22, 1986

[54] POROUS MULLITE

[75] Inventor: Barry K. Speronello, River Edge, N.J.

[73] Assignee: Engelhard Corporation, Menlo Park, N.J.

[21] Appl. No.: 682,044

[22] Filed: Dec. 14, 1984

[51] Int. Cl.[4] .................... B01J 20/10; B01J 21/12
[52] U.S. Cl. .................................. 502/263; 502/80; 423/131
[58] Field of Search ................. 502/80, 84, 263; 423/131

[56] References Cited

U.S. PATENT DOCUMENTS

| | | | |
|---|---|---|---|
| 1,839,062 | 12/1931 | Tellier | 502/80 |
| 2,536,122 | 1/1951 | Bertorelli et al. | 423/131 |
| 2,840,618 | 6/1958 | Hecht | 502/84 X |
| 2,939,764 | 7/1960 | Schoenfelder et al. | 423/131 |
| 2,939,765 | 7/1960 | Schöenfelder et al. | 423/131 |
| 3,235,512 | 2/1966 | Koepernik | 502/84 |

Primary Examiner—Carl F. Dees
Attorney, Agent, or Firm—I. L. Moselle

[57] ABSTRACT

Clay, preferably kaolin, is calcined through its exotherm, but without substantial mullite formation (e.g., 1 hour at 1000° C.). The calcined clay is leached with an alkaline aqueous solution to remove (i.e., leach) silica. The severity of leaching, i.e., amount of silica removed, determines whether the final product will comprise mullite plus excess $Al_2O_3$. If the molar $Al_2O_3/SiO_2$ ratio is $<3/2$ the final product will contain mullite plus excess $SiO_2$ and if the $Al_2O_3/SiO_2$ ratio is $>3/2$, the final product will contain excess $Al_2O_3$. The leached clay is washed, preferably under acid conditions at about pH 3-5, to remove excess alkali ions; and then dried. The washed clay is then calcined at conditions to produce mullite (e.g., 3 hours at 1250° F.). Materials made in this manner exhibit high pore volume despite the final high temperature heat treatment.

11 Claims, No Drawings

POROUS MULLITE

RELATED APPLICATIONS

This application is related to my commonly assigned copending application Ser. No. 505,650, filed June 20, 1983 (now abandoned) and to a commonly assigned copending application Ser. No. 577,092, filed Feb. 6, 1984 in the names of Silverman and Speronello.

BACKGROUND OF THE INVENTION

This invention relates to novel porous mullite articles, the manufacture thereof and to the use of the porous mullite articles as contact materials and catalyst supports. The invention relates also to novel procedures for preparing mullite materials, including shaped mullite materials, such as small spheres (microspheres). The procedure involves calcining clay, which may be in the form of shaped preformed bodies, to a temperature at which the clay undergoes an exothermic reaction and below which substantial mullite is formed, and thereafter removing silica from the bodies by leaching with a strong base and then calcining the bodies at a temperature at which the leached clay undergoes a reaction to form mullite.

Kaolin clays are hydrated aluminum silicates of the approximate formula $Al_2O_3.2SiO_2.2H_2O$. It is well known that when kaolin clay is heated in air that a first transition occurs at about 550° C. associated with an endothermic dehydroxylation reaction. The resultant material is generally referred to as metakaolin. Metakaolin persists until the material is heated to about 975° C. and begins to undergo an exothermic reaction. This material is frequently described as kaolin which has undergone the characteristic exothermic reaction. Some authorities refer to the material as a defect aluminum-silicon spinel or as a gamma alumina phase. See Donald W. Breck, ZEOLITE MOLECULAR SIEVES, published by John Wiley & Sons, 1974, pages 314-315. On further heating to about 1050° C., mullite is formed. The mullitization reaction that takes place when kaolin clay is utilized as the sole source of silica and alumina may be represented by the following equation where the approximate chemical formula for kaolin (without the water of hydration) is given as $Al_2O_3.2SiO_2$, and the formula for mullite is $3Al_2O_3.2SiO_2$:

$$3(Al_2O_3.2SiO_2) \rightarrow 3Al_2O_3.2SiO_2 + 4SiO_2.$$

The term represented by $4SiO_2$ is the free silica generated as a result of the conversion to mullite. The free silica can be amorphous or crystalline, depending on calcination temperature and time. A high purity kaolin clay can theoretically be converted into about 64% mullite on a weight basis.

Mullite is widely used in ceramic applications such as in the manufacture of refractory grains. For these applications, dense impervious products are needed and porosity is undesirable. See, for example, U.S. Pat. No. 3,462,505.

It is also well known that the reactivity of kaolin clay changes as it undergoes these thermal transitions. See the Breck publication supra at page 315. In fact, the reactivity of both silica and alumina in metakaolin with sodium hydroxide solution is utilized in the production of the crystalline zeolitic molecular sieve known as zeolite A. In such a process all or virtually all of the silica and alumina react to form crystals of $Na_2O.Al_2O_3.2SiO_2.XH_2O$. It is also known that when kaolin undergoes the exothermic reaction at 975° C. silica can be leached readily with sodium hydroxide solution with minimal removal of alumina. Reference is made to U.S. Pat. No. 2,939,764 to Schoenfelder et al. The '764 patent contains figures demonstrating the effect of calcining kaolin clay at various temperature levels on the solubility of alumina and silica in sodium hydroxide solutions of concentrations ranging from 5% to 40%. The figures indicate that up to about 80% by weight of the silica content of high purity kaolin can be leached with strong caustic solutions when the kaolin has previously been calcined at about 1000° C. The teachings of U.S. Pat. No. 2,939,764 are incorporated herein by cross-reference thereto.

The reaction of kaolin clay calcined to undergo the exotherm with sodium hydroxide solution can also be utilized in the manufacture of catalyst composites containing synthetic crystalline faujasite and a silica-depleted porous residue of calcined clay. Preferably, a small amount of metakaolin is incorporated into the reaction mixture. It is also known that during such reaction, the original sodium hydroxide solution is converted into a solution that comprises sodium silicate, reflecting silica removal from the calcined clay and the resulting development of a porous nonzeolitic component.

When kaolin clay is thermally transformed into mullite and silica, it is known that the silica can be extracted from the mullite with a strong base. See for example, U.S. Pat. No. 2,536,122 and Japanese Patent Application No. 69 84,626 (CA81(10)53673a). It is my understanding that removal of the free silica in this fashion (or by reaction with sources of $Al_2O_3$) to form additional mullite is practiced to improve the refractoriness of the resultant solid. In this regard, it is noted that the $Al_2O_3$—$SiO_2$ phase diagram (Phase Diagrams for Ceramists, Amer. Cer. Soc. Ed., 1964, Diagrams 313-314) shows that pure mullite does not melt until about 1850° C.; however, in the presence of free silica, melting begins at only about 1600° C. Therefore, by eliminating free silica, the refractoriness of millite is improved to an extent such that the melting point is about 250° C. higher. With regard to the prior practice of removing silica from mullite produced by calcining clay, U.S. Pat. No. 2,536,122 describes grinding the clay after calcination and before the extraction step. It is reasonable to conclude that when the resulting leached mullite grains are formed into refractory articles, porosity in the finished articles is reduced by addition of binders and also by sintering procedures conventionally used in manufacturing mullite products. To the best of my knowledge and belief, there has been no acknowledgment or appreciation of the fact that mullite purification by removal of silica from mullitized kaolin wound change the pore structure.

Furthermore, the maximum amount of silica that can be extracted from kaolin calcined to mullite phase is only about 36% by weight, limiting the molar $SiO_2/Al_2O_3$ ratio of the resultant solid product to about 3/2 and the resultant increase in porosity to about 0.25 cc/g.

SUMMARY OF THE INVENTION

In accordance with the present invention, kaolin is first calcined through its exotherm, but without substantial mullite formation. Then it is leached with a strong base to remove the desired amount of $SiO_2$, and finally it is calcined to a sufficiently high temperature to form mullite. By leaching before mullite formation, more silica may be removed than if leaching were done after mullite formation, and this makes possible the manufacture of materials having a wide variety of $Al_2O_3/SiO_2$ molar ratios including those with $Al_2O_3/SiO_2$ molar ratios $>3/2$. The surface area and pore structure of the novel mullite products do not change appreciably when the products are heated to temperatures up to about 1200° C. Prior art porous contact material such as catalyst supports adapted for use at high temperatures such as silica, alumina in its various forms, silica-alumina, and the like, have certain disadvantages at high temperature; e.g., above about 1000° C. The desirable surface area and porosity of such products tend to be lost as the temperature of use rises above about 1000° C.

The porous mullite bodies of this invention have several distinct advantages over bodies that are made by cementing high surface area powders into shaped bodies using binders. Bodies of this invention have been fired to high temperatures to achieve the mullite conversion reaction. This high temperature calcination forms strong inter-crystalline bonds between mullite crystals, and results in excellent strength and attrition resistance for porous mullite bodies of this invention. Because porous mullite bodies of this invention contain no added binder, their desirable pore structure and surface area is not modified by other less desirable materials. Because the bodies of this invention are free of binders which can sinter and degrade, particularly at high temperatures under severe use environments, they are extremely stable and refractory. Finally, mullite aggregates possessing of the aforementioned combination of desirable properties can be obtained in the form of bodies having both the size and shape useful for specific catalytic and sorptive applications; e.g., microspheres, round pellets, cylinders, and honeycombs.

DESCRIPTION OF PREFERRED EMBODIMENTS OF THE INVENTION

This invention in a preferred aspect comprises methods for making porous mullite products, including shaped articles. Clay, preferably high purity kaolin, is calcined through its exotherm, but without substantial mullite formation (e.g., 2 hours at 996° C.). The calcined clay is leached with an alkaline aqueous solution to remove (i.e., leach) silica. The severity of leaching, i.e., amount of silica removed, determines whether the final product will comprise mullite plus excess $Al_2O_3$ or excess $SiO_2$. If the $Al_2O_3/SiO_2$ ratio after leaching is $<3/2$, the final product will contain mullite plus excess $SiO_2$. If $Al_2O_3/SiO_2$ is $>3/2$, there is not sufficient $Al_2O_3$ to tie up all the $SiO_2$ as mullite. Prior to the second calcination, the excess $SiO_2$ is amorphous. After the second calcination, the excess $SiO_2$ is crystalline (tridymite or cristobalite). If the $Al_2O_3/SiO_2$ ratio is 3/2, the final product may contain only mullite. On the other hand, if sufficient silica is removed to result in a $Al_2O_3/SiO_2$ molar ratio $>3/2$, the final product will contain mullite and alumina. Information contained in the Schoenfelder et al patent supra may be used as a guide to select calcination temperature and time in the range of about 800° C. to 1200° C. and to select sodium hydroxide concentrations such as to permit leaching of a desired amount of silica or silica and alumina. The leached clay is washed, preferably under mildly acid conditions at about pH 3–5, to remove excess alkali ions, and then dried. The washed clay is then calcined at conditions to produce mullite (e.g., 3 hours at 1249° C.). Surprisingly, materials made in this manner exhibit high pore volume (generally in the range of 0.5 cc/g) despite the final high temperature heat treatment.

To provide mullite bodies in the form of shaped bodies, a mixture containing clay and a fugitive liquid that functions as a binder for the green (uncalcined) bodies is formed into green bodies, preferably of substantially the same shape and size (or somewhat larger size to compensate for shrinkage during calcination) as those desired in the finished product. Shaped bodies can also be produced by dry pressing without a binder, or with a wax binder. The shaped clay-containing bodies are then heated to undergo the exotherm, followed by leaching and calcination to crystallize mullite. An alkaline solution such as alkali metal hydroxide solution, for example sodium hydroxide, may be used advantageously at a temperature at or below the boiling point of the solution to leach silica and form pores in the bodies.

The initial calcination should be done under conditions of time and temperature to achieve substantial completion of the exothermic reaction without substantial mullite formulation; for example, 1 hour at 1000° C. Below 800° C. the exothermic reaction does not occur without some mineralizing agent, and above about 1100° C. it is difficult to stop the reaction before substantial mullite formation.

The second calcination should be done under conditions of time and temperature to convert the $SiO_2$ and $Al_2O_3$ to mullite, and depending on the $Al_2O_3/SiO_2$ ratio of the leached body, either excess $Al_2O_3$ ($Al_2O_3/SiO_2>3/2$) or excess $SiO_2$($Al_2O_3/SiO_2<3/2$). If the $Al_2O_3/SiO_2$ is about 3/2, essentially complete conversion to mullite can occur. For conversion to mullite to occur at practically useful rates, the calcination temperature must be above ca 1050° C. in the absence of a mineralizing agent.

The mullite bodies of this invention contain a small amount of alkali metal after the leaching procedure. If desired, the alkali metal concentration may be reduced by extensive washing or by contacting the mullite with an aqueous solution containing hydrogen ions or other fugitive cations (e.g., $NH_4+$) in sufficient concentration and for a time long enough to effect the desired reduction in alkali metal content.

DESCRIPTION OF PREFERRED EMBODIMENTS

Clays that are suitable for conversion into porous mullite are those which, upon calcination, undergo the characteristic exotherm and form the silica alumina spinel phase and excess silica e.g., kaolinites, halloysites, smectites, and illites.

The particle size distribution of the clay and its degree of agglomeration in the green bodies are important because these factors influence the macropore structure of the calcined body prior to leaching and this macroporosity is retained in the porous mullite after leaching. It is helpful for the calcined body to contain some porosity prior to leaching, because porosity accelerates the diffusion of reactants and products of the leaching reaction into and out of the body, and thereby shortens the necessary leaching time. Large pores can also be useful to improve the performance of certain porous mullite products. For example, large pores can be a repository for contaminant metals when porous mullite is used as a fluidizible contact material for the Asphalt Resid Treatment process, thereby extending the useful service life of the material. However, too much macroporosity can reduce the strength and attrition resistance of porous mullite shapes. Therefore, the particle size and degree of agglomeration of clay used to produce porous mullite shapes is a compromise between maximum strength (i.e., minimum porosity) and some macroporosity. Clays with broad particle size distributions generally produce minimum porosity prior to leaching. An example of such a clay is ASP®900 hydrous kaolin, which contains particles up to 20 um. in diameter, an average particle size (weight basis) of ca. 1.5 um., and about 25% by weight finer than 0.5 um. Clays with a narrower particle size distribution do not pack as efficiently as clays having a broader particle size distribution, resulting in a greater quantity of macroporosity. An example of such a clay is ASP®400 hydrous kaolin, which contains particles up to 20 um. in diameter, an average particle size of ca. 5 um., and nothing <0.5 um. A good compromise between these extremes, which results in about 0.2 cc/g of macroporosity in microspheres after the initial calcination, is ASP®600 hydrous kaolin which contains nothing coarser than about 8 um., has an average particle size of 0.9 um., and contains 35% <0.5 um. (As used herein, all particle sizes of hydrous clays in the micron-size range are those determined by sedimentation and are therefore expressed as "equivalent spherical diameter" or "e.s.d." in conventional manner.)

Macroporosity can also be increased by incorporating calcined clay into the raw material mixture that is formed into the shaped body. It is believed that the calcined clay contains a significant amount of porous agglomerates that do not break down during typical forming operations. Therefore this porosity is retained in the shaped bodies. If it is desired, about 0.2–0.3 cc/g of macroporosity can be added to the shaped body by replacing about 50% of the hydrous clay with calcined clay such as Satintone®No. 1 or Satintone®No. 2 clays. Normally, however, there is sufficient porosity in the hydrous clay shape, and the addition of calcined clay is unnecessary.

Macroporosity may also be incorporated into the shaped bodies through the use of carbonaceous burn-out agents. Burn-out agents are particulate materials of the approximate size and shape of the desired porosity which are mixed with the other raw materials prior to forming the shaped body. During calcination, the burn-out materials burn substantially away, thereby imparting porosity. Some common burn-out agents are ground walnut shells, ground peanut shells, flours and carbon black.

The purity of the clay to be processed into porous mullite will depend upon the end use of the mullite body. Normally preferred are high purity clays that are low in iron, titania, alkalies, and free alumina. Presently preferred are high purity, water-washed kaolinitic clays from deposits of the type found in Georgia, such clays typically having a $SiO_2/Al_2O_3$ molar ratio of about 2/1 and containing, on a volatile-free weight basis, less than 2% $TiO_2$, less than 2% iron (measured as $Fe_2O_3$) and less than 1% total alkali and alkaline earth oxides.

When used as a support for a CO oxidation promoter in an FCCU (fluid catalytic cracking unit), transition metal impurities such as iron can catalyze undesirable dehydrogenation reactions that can result in the formation of excess coke and hydrogen. For other uses, transition metal impurities may not be objectionable and possibly even desirable. Alkali and alkaline earth oxide impurities and oxides of iron are undesirable because they are fluxes which can cause excessive sintering of the shaped body during the calcination step in which mullite is formed.

Forming can be conducted by conventional processes known in the art. Microspheres can be formed by spray drying a slurry of clay in water. In addition, a fugitive binder, such as polyvinyl alcohol, may be added to the slurry prior to spray drying to impart additional strength to the green microspheres prior to calcination. The preferred method to form microspheres is to prepare a slurry containing about 65 wt % of finely-divided, high purity hydrous kaolin clay (e.g., ASP®600 clay), 0.3 wt % tetrasodium pyrophosphate and water; and to spray dry the slurry using a spray dryer operating with a gas inlet temperature of about 540° C. and an outlet temperature of about 120° C. This results in a microsphere which, prior to calcination, is characterized by 0.25 cc/g of macroporosity and essentially no meso- or microporosity. If a greater quantity of macroporosity is desired, some of the hydrous kaolin clay may be replaced by calcined kaolin clay. For example, if about ½ of the hydrous clay described above is replaced with Satintone®No. 1 clay, the resultant spray dried microspheres will contain about 0.5 cc/g of macroporosity.

Cylindrical shaped bodies (pellets) in the size ranges of about 1/32" to ½" diameter may conveniently be made by extruding a mixture of about 3 parts high purity Georgia kaolin clay (e.g., ASP®800 clay) and 1 part water using an auger-type extruder. This mixture has resulted in about 0.24 cc/g of macroporosity, 0.03 cc/g of mesoporosity, and essentially no microporosity prior to leaching. Macroporosity, mesoporosity, and microporosity are defined as pores having diameters in the following ranges respectively: 600–20,000 A, 100–600 A, and <100 A.

Other forming procedures can be utilized.

Preferred uses for the porous mullite products of this invention are those taking advantage of their unique combination of high pore volume, excellent refractoriness, and high strength.

One example is as a support for catalyst used to oxidize carbon monoxide or hydrocarbons. These catalysts generally consist of one or more metals such as Pt or Pd on an oxide support. Because the oxidation reaction is highly exothermic, these catalysts can operate at temperatures typically up to about 1300° C. At these temperatures, many common supports, such as transition aluminas, experience an appreciable loss of surface area. In contrast, the surface area of porous mullite is relatively unaffected by such high temperatures. Porous mullite honeycomb shaped bodies comprising parallel channels with openings of about 1.5 mm across and walls about 0.4 mm thick and having a surface area of about 50 $m^2/g$ would be particularly useful as a support for a precious metal automobile exhaust catalyst.

Microspherical porous mullite articles having a surface area between about 20 $m^2/g$ and 50 $m^2/g$ and hardness at least comparable to that of commercially useful fluid cracking catalyst would be useful as a support for a precious metal promoter for the oxidation of carbon monoxide in the regenerator of a fluidized catalytic cracking unit (FCCU). When petroleum oils are cracked in an FCCU, a carbonaceous material (so-called "coke") is built up on the particles of the cracking catalyst. In the FCCU, coked catalyst is transferred from the cracking reactor to the catalyst regenerator where, in a fluidized bed, it is contacted with oxygen-contaning gases at temperatures between about 600° C. and 760° C. and the coke is burned off. Carbon monoxide oxidation promoters are used to maximize the amount of CO that is oxidized to $CO_2$ in the fluidized dense bed of the regenerator. If an excessive amount of CO escapes the dense bed, it can oxidize downstream of the dense bed, resulting in undesirable afterburning. This can result in overheating and damage to the FCCU or to equipment used to handle the regenerator flue gas.

A CO oxidation promoter can be made by impregnating porous mullite microspheres to incipient wetness with a chloroplatinic acid solution of the appropriate concentration to result in from about 100 to 500 ppm of pt being deposited on the support. The resultant moist material may be dried prior to adding it to the FCCU, or it may be added in the moist state, whereupon it would be dried by the high temperature of the FCCU.

Another use is as a substrate for hydroprocessing catalysts. Hydroprocessing catalysts are generally composed of Co and Mo or Ni and Mo or Ni and W supported on alumina or silica-alumina. A typical hydrodesulfurization catalyst may contain about 1-4% Co and 3-12% Mo. Such catalysts are used to remove undesirable sulfur and nitrogen compounds from petroleum streams.

When processing petroleum streams that contain large amounts of contaminant metals, such as petroleum residua containing 2-200 ppm of Ni and/or V, the contaminant metals accumulate in the pores of the catalyst and reduce the activity of the catalyst. Katzer et al, in the Chemistry of Catalytic Processes, McGraw Hill, 1979, report that while there are conflicting data in the literature regarding an optinum pore structure, it is clear that a catalyst with a large pore volume is preferred for hydroprocessing metals contaminated streams. Tamm et al, (Ind. Eng. Chem. Process Res. Dev., 1981, 20, 262-273) report that small pores, < about 200A diameter, would have their diameters significantly constricted by metals deposits. Therefore, porous mullite (which can have few if any pores <100A in diameter, ca 0.25 cc/g of pores of about 250-300A diamter, and up to about 0.4 cc/g of pores having diameters >600A) has a pore structure that is well suited to hydroprocessing of metals-containing petroleum streams.

Another suggested use of the porous mullite microspheres is as all or part of the solid substantially catalytically inert contact material used in the ASPHALT RESIDUAL PROCESS (ART) described in U.S. Pat. No. 4,263,125.

The following examples illustrate a presently preferred embodiment of the invention in which spray dried microspheres of hydrous kaolin clay are calcined to spinel phase, leached and then calcined to mullite phase.

A fine size fraction (about 80% by weight finer than 2 microns, equivalent spherical diameter) of high purity hydrated Georgia Kaolin clay supplied under the trademark ASP ®600 was formed into a 62.5 percent solids deflocculated aqueous slip by agitating the clay in water in the presence of tetrasodium pyrophosphate in amount of about 0.3 percent of the clay weight. The slip was spray dried to produce microspheres employing air inlet and outlet temperatures of approximately 593° and 230° C., respectively. A minus 60 mesh (Tyler) fraction of microspheres was recovered by screening. The microspheres of hydrated kaolin clay were calcined in a rotary calciner just past the characteristic exotherm to convert the clay into the so-called "spinel phase". The micropheres were exposed to a maximum temperature in the range of about 980° C. to 1100° C. for a time in the range of about ½ to 2 hours. The microspheres analyzed (wt) 51% $SiO_2$; 46% $Al_2O_3$; 0.5% $Na_2O$; 0.4% $Fe_2O_3$; and 1.9% $TiO_2$.

Nine hundred (900)g of the microspheres calcined to the "spinel phase" was added to 3000 g of 25% NaOH solution with stirring to suspend the solids. This slurry was heated to 82° C. and maintained at 82° C. for 1 hour. The slurry was deliquored by vacuum filtration over 40 mesh nylon cloth, and the filter cake was washed with 4 liters of deionized water. The leached solid material was dried at 110° C. The dried material was washed further by slurrying it for ½ hour in a solution of 2000 g deionized $H_2O$ and 200 g of 2 molar $NH_4NO_3$ solution after adjusting the slurry pH to 4.0 using $HNO_3$. The slurry was deliquored by vacuum filtration, the filter cake was washed with 3 liters of deionized water, and it was dried overnight at room temperature. The dried powder was calcined for 3 hours at 1250° C.

The resultant product had a mullite index of 61%, showed a trace of excess alpha $Al_2O_3$ by X-ray diffraction, had a BET surface area of 27.9 m$^2$/g, a dodecane pore volume of 0.50 cc/g, and an EAI (Engelhard Attrition Index) of 1.1%/second. Such materials should be useful as a catalyst support, for example, as a support for a precious metal catalyst, or used as the contact material to remove carbonaceous and metal contaminants of heavy crude or resid fractions of petroleum by the selective vaporization process described in U.S. Pat. No. 4,263,128. Materials comprising mullite plus excess $Al_2O_3$ should be useful in applications where free silica is detrimental, because all silica should be tightly bound in the mullite.

Nine hundred (900)g of the calcined microspheres used in Example I were slurried with stirring to suspend the solids in 3000 g of 25% by wt. NaOH solution at 82° C. The slurry heated autogenously to 95° C. and cooled to 82° C. over 15 minutes using handheld cooling loop of stainless steel tubing through which cold tap water was flowing. After 45 minutes at 82° C. the slurry was vacuum filtered on a 18.5 cm. dia. Buchner funnel through a 325 mesh nylon mesh cloth that had been moistened with dilute (ca. 10%) NaOH solution to preclude formation of silica gel from the sodium silicate solution. The wet cake was washed with deionized water and then slurried with stirring to suspend the solids in a room temperature solution of 2000 g deionized water and 200 g of 2 molar ammonium nitrate solution. The pH of the slurry was adjusted to 4 using nitric acid. After ½ hour, the slurry was vacuum filtered on a 18.5 cm. dia. Buchner funnel through a Whatman #54 filter paer, and washed with 3 liters of deionized water. The wet cake was dried overnight at 100° C., and calcined for 2 hours at 1225° C.

The BET surface area of the product was 27.7 m$^2$/g. Mullite index was 60%

Chemical analysis was as follows:

| $Na_2O$ | $Fe_2O_3$ | $TiO_2$ | $SiO_2$ | $Al_2O_3$ | LOI |
|---------|-----------|---------|---------|-----------|-----|
| 0.04%   | 0.79%     | 3.23%   | 17.31%  | 78.43%    | 1.13% |

The SiO$_2$/Al$_2$O$_3$ molar ratio represented by the analysis is 2.7.

DEFINITION AND DETAILS OF TEST PROCEDURES USED HEREIN

Identification of mullite crystal phase using X-ray powder diffraction

X-ray Powder Diffraction File, Card No. 15-776, Leonard G. Berry (Ed.), Joint Committee on Powder Diffraction Standards*, 1972 was used as the reference for the mullite X-ray powder diffraction pattern.

*1601 Park Lane, Swarthmore, Pa. 19081

Mullite index is measured by standard quantitative X-ray diffraction techniques relative to a nominally 100% mullite reference and using copper K-alpha radiation. A mullite index of 100 means that the mullite X-ray peak intensity for the peaks at 16, 33, 40, and 60° 2-theta have intensities equal to the 100% mullite reference.

Volume of pores in range of 30–20,000Å

The volume of pores having diameters in the range of 30–20,000Å was determined by conventional mercury intrusion porosimetry technique using a scanning mercury porosimeter manufactured by Quantachrome Corp. The relationship between pore diameter and intrusion pressure was calculated using the Washburn equation and assuming a contact angle of 140° and a surface tension of 484 ergs/cm$^2$. Before being tested for volume of pores having diameters in the range of 30–20,000Å, the materials being tested were pretreated by heating them in air to about 350° C. for one hour and then cooling them in a dessicator.

Dodecane pore volume

The total volume of pores measured by wetting to incipient wetness with dodecane.

The procedure for measuring EAI is described in European Patent Application No. 843074899.

I claim:

1. A method for producing a material comprising synthetic crystalline mullite which comprises: calcining clay through its exotherm, but without substantial mullite formation, and leaching the resulting calcined clay with an alkaline aqueous solution to remove silica, washing the leached clay to remove alkali ions; drying and then calcining the washed, leached clay at conditions to produce mullite.

2. The method of claim 1 wherein said clay is kaolin clay.

3. The method of claim 1 wherein the clay is in the form of shaped bodies such as spray dried microspheres, extruded pellets or honeycombs before calcining clay through the exotherm.

4. The method of claim 1 wherein the leached clay is washed under acid conditions at pH 3-5.

5. The method of claim 1 wherein the clay is calcined through its exotherm at a temperature in the range of 800° to 1100° C.

6. The method of claim 1 wherein the clay is calcined through its exotherm at 800° to 1100° C. and the washed leached clay is calcined at a temperature above 1050° C.

7. The method of claim 1 wherein sufficient silica is removed during leaching to result in a Al$_2$O$_3$/SiO$_2$ molar ratio greater than 3/2.

8. Material produced by the method of claim 1.

9. Shaped bodies produced by the method of claim 3.

10. Shaped bodies of claim 9 having a Al$_2$O$_3$SiO$_2$ molar ratio greater than 3/2.

11. Shaped bodies of claim 10 in the form of attrition-resistant microspheres.

* * * * *

UNITED STATES PATENT AND TRADEMARK OFFICE
CERTIFICATE OF CORRECTION

PATENT NO. : 4,601,997
DATED : July 22, 1986
INVENTOR(S) : Barry K. Speronello

It is certified that error appears in the above-identified patent and that said Letters Patent are hereby corrected as shown below:

Column 2, Line 42 delete the word [millite] and insert --mullite--

Column 8, Line 6 delete [AI$_2$O$_3$;] and insert --Al$_2$O$_3$;--

Column 8, Line 45 before the word minutes insert the word --more--

Column 8, Line 57 delete the word [paer] and insert --paper--

Column 9, Line 1 delete [AI$_2$O$_3$] and insert --Al$_2$O$_3$--

Signed and Sealed this

Twenty-fourth Day of March, 1987

Attest:

DONALD J. QUIGG

*Attesting Officer*  *Commissioner of Patents and Trademarks*